US011948373B2

(12) United States Patent
Xu et al.

(10) Patent No.: US 11,948,373 B2
(45) Date of Patent: *Apr. 2, 2024

(54) AUTOMATIC LICENSE PLATE RECOGNITION

(71) Applicant: Verkada Inc., San Mateo, CA (US)

(72) Inventors: Yi Xu, Belmont, CA (US); Yunchao Gong, Los Altos, CA (US); Suraj Arun Vathsa, Irvine, CA (US); Mayank Gupta, Foster City, CA (US); Naresh Nagabushan, San Mateo, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,883

(22) Filed: Dec. 12, 2022

(65) Prior Publication Data

US 2023/0343113 A1    Oct. 26, 2023

Related U.S. Application Data

(63) Continuation of application No. 17/871,786, filed on Jul. 22, 2022, now Pat. No. 11,557,133.

(Continued)

(51) Int. Cl.
*G06V 20/62*     (2022.01)
*G06V 10/774*    (2022.01)
(Continued)

(52) U.S. Cl.
CPC .......... *G06V 20/625* (2022.01); *G06V 10/774* (2022.01); *G06V 20/54* (2022.01); *G06V 30/148* (2022.01)

(58) Field of Classification Search
None
See application file for complete search history.

(56) References Cited

U.S. PATENT DOCUMENTS 5,982,929 A * 11/1999 Ilan ................... G06V 30/2276
                                                      704/9
10,423,827 B1 * 9/2019 Wu ......................... G06V 20/70
(Continued)

FOREIGN PATENT DOCUMENTS

CN    109657629 A  *  4/2019   ......... G06K 9/00442
GB      2598640 A     3/2022
(Continued)

OTHER PUBLICATIONS

Lynch, Ms. "Automated License Plate Recognition (ALPR) System." (2012). (Year: 2012), 2012.
(Continued)

*Primary Examiner* — Sean M Conner
(74) *Attorney, Agent, or Firm* — Perkins Coie LLP; Michael A. Glenn (57) ABSTRACT

Automatic license plate recognition occurs when a light sensor that continually captures video detects motion as a vehicle is driven through a gate. The light sensor detects the vehicle and license plate in the video stream captured by the light sensor. An algorithm associated with the video stream of the light sensor is trained to detect license plates. The light sensor starts executing the recognition algorithm when it detects motion. Recognition of characters in the license plate is based upon an aggregation of several captured video frames in which a license plate is detected.

17 Claims, 8 Drawing Sheets

Related U.S. Application Data (60) Provisional application No. 63/363,442, filed on Apr. 22, 2022.

(51) Int. Cl.
   *G06V 20/54*   (2022.01)
   *G06V 30/148*  (2022.01)

(56) References Cited

U.S. PATENT DOCUMENTS

| | | | |
|---|---|---|---|
| 11,557,133 B1* | 1/2023 | Xu | G06V 20/54 |
| 2009/0202152 A1* | 8/2009 | Takebe | G06F 18/29 |
| | | | 382/185 |
| 2009/0263021 A1 | 10/2009 | Udagawa et al. | |
| 2013/0272579 A1 | 10/2013 | Fan et al. | |
| 2016/0019428 A1 | 1/2016 | Renner et al. | |
| 2016/0247257 A1 | 8/2016 | Cheung | |
| 2017/0337435 A1* | 11/2017 | Uliyar | G06V 30/19173 |
| 2018/0373934 A1 | 12/2018 | Bridges et al. | |
| 2019/0051127 A1 | 2/2019 | Kanga et al. | |
| 2019/0108410 A1 | 4/2019 | Zhang | |
| 2019/0228276 A1 | 7/2019 | Lei et al. | |
| 2020/0005050 A1* | 1/2020 | Higuchi | G06V 20/56 |
| 2020/0202535 A1* | 6/2020 | Lee | H04N 23/60 |
| 2021/0089790 A1 | 3/2021 | Nishimura et al. | |
| 2021/0097277 A1 | 4/2021 | Hirai et al. | |
| 2021/0303899 A1 | 9/2021 | Mains et al. | |
| 2022/0076042 A1* | 3/2022 | Zhao | G06V 30/142 |
| 2022/0101037 A1 | 3/2022 | Chua et al. | |
| 2022/0129688 A1* | 4/2022 | Yu | G06Q 10/0838 |
| 2022/0207889 A1 | 6/2022 | Lin et al. | |
| 2022/0335824 A1 | 10/2022 | Carson et al. | |

FOREIGN PATENT DOCUMENTS

| | | |
|---|---|---|
| KR | 102105705 B1 | 4/2020 |
| KR | 102200204 B1 | 1/2021 |

OTHER PUBLICATIONS

Gandhi, BM Kumar, and M. Kameswara Rao. "A prototype for IoT based car parking management system for smart cities." Indian Journal of Science and Technology 9.17 (2016): 1-6. (Year: 2016), 2016.

Sadhukhan, Pampa. "An IoT-based E-parking system for smart cities." 2017 International conference on advances in computing, communications and informatics (ICACCI). IEEE, 2017. (Year: 2017), 2017.

Cowdrey, Kevin William George, and Reza Malekian. "Home automation-an IoT based system to open security gates using number plate recognition and artificial neural networks." Multimedia Tools and Applications 77 (2018): 20325-20354. (Year: 2018), 2018.

Liu, Zhemin, Weiling Chen, and Chai Kiat Yeo. "Automatic detection of parking violation and capture of license plate." 2019 IEEE 10th Annual Information Technology, Electronics and Mobile Communication Conference (IEMCON). IEEE, 2019. (Year: 2019), 2019.

Wang, Junhui, et al. "Ultra-Fast Mini License Plate Recognition System Based-on Vision Processing Unit." 2020 2nd International Conference on Big-data Service and Intelligent Computation. 2020. (Year: 2020), 2020.

Zhang, Cong, Qi Wang, and Xuelong Li. "V-LPDR: Towards a unified framework for license plate detection, tracking, and recognition in real-world traffic videos." Neurocomputing 449 (2021): 189-206. (Year: 2021), 2021.

International Search Report and Written Opinion for WO Patent Application No. PCT/US23/66044 dated Aug. 11, 2023, 13 pages.

Safaei, Amin, et al., "Real-time search-free multiple license plate recognition via likelihood estimation of salie", Computers & Electrical Engineering 56 (2016): 15-29. (Year: 2016).

Xi, Jie, et al., "A video text detection and recognition system", IEEE International Conference on Multimedia and Expo, 2001. ICME 2001 . . . IEEE Computer Society, 2001. (Year: 2001).

\* cited by examiner

AUTOMATIC LICENSE PLATE RECOGNITION

CROSS-REFERENCE TO RELATED APPLICATIONS

This application is a continuation of U.S. Utility application Ser. No. 17/871,786, titled Automatic License Plate Recognition, and filed on Jul. 22, 2022 which claims priority to U.S. Provisional Application No. 63/363,442, titled Automatic License Plate Recognition, and filed on Apr. 22, 2022, both of which are incorporated by reference herein in their entirety by this reference thereto.

FIELD

Various of the disclosed embodiments concern automatic license plate recognition.

BACKGROUND

Automatic license plate (or number plate) recognition (ANPR) is a technology that uses optical character recognition on images to read vehicle registration plates to create vehicle location data. It can use existing closed-circuit television, road-rule enforcement cameras, or cameras specifically designed for the task. Among its many uses, ANPR is used by police forces around the world for law enforcement purposes, including to check if a vehicle is registered or licensed. It is also used for electronic toll collection on pay-per-use roads and as a method of cataloguing the movements of traffic, for example, by highway agencies.

There are several difficulties attendant with ANPR. These include, for example:
Poor file resolution, usually because the license plate is too far away, but sometimes resulting from the use of a low-quality camera;
Blurry images, particularly blurriness because of motion;
Poor lighting and low contrast due to overexposure, reflection, or shadows;
An object obscuring part of the plate, quite often a tow bar, or dirt on the plate;
License plates that are different at the front and the back of the vehicle because of towed trailers, campers, etc.;
Vehicle lane change in the camera's angle of view during license plate reading;
Use of a nonstandard font, which is popular for vanity plates;
Circumvention techniques;
Lack of coordination between countries or states. Two cars from different countries or states can have the same license plate number but different plate designs.

SUMMARY

Automatic license plate recognition occurs when a camera that continually captures video detects motion as a vehicle is driven through a gate. The camera detects the vehicle and license plate in the video stream captured by the camera. An algorithm associated with the video stream of the camera is trained to detect license plates. The camera starts executing the recognition algorithm when it detects motion. Recognition of characters in the license plate is based upon an aggregation of several captured video frames in which a license plate is detected.

DETAILED DESCRIPTION

In typical commercial automatic license plate recognition (ANPR) systems a physical trigger starts the operation of a camera which captures a single image that is used to detect the characters on the license plate. There are various limitations with this approach including false triggering, failure to trigger, lack of coordination of the triggering event with the position of the license plate, defective image capture, a blurry or clipped image, and the like.

Figure 1:
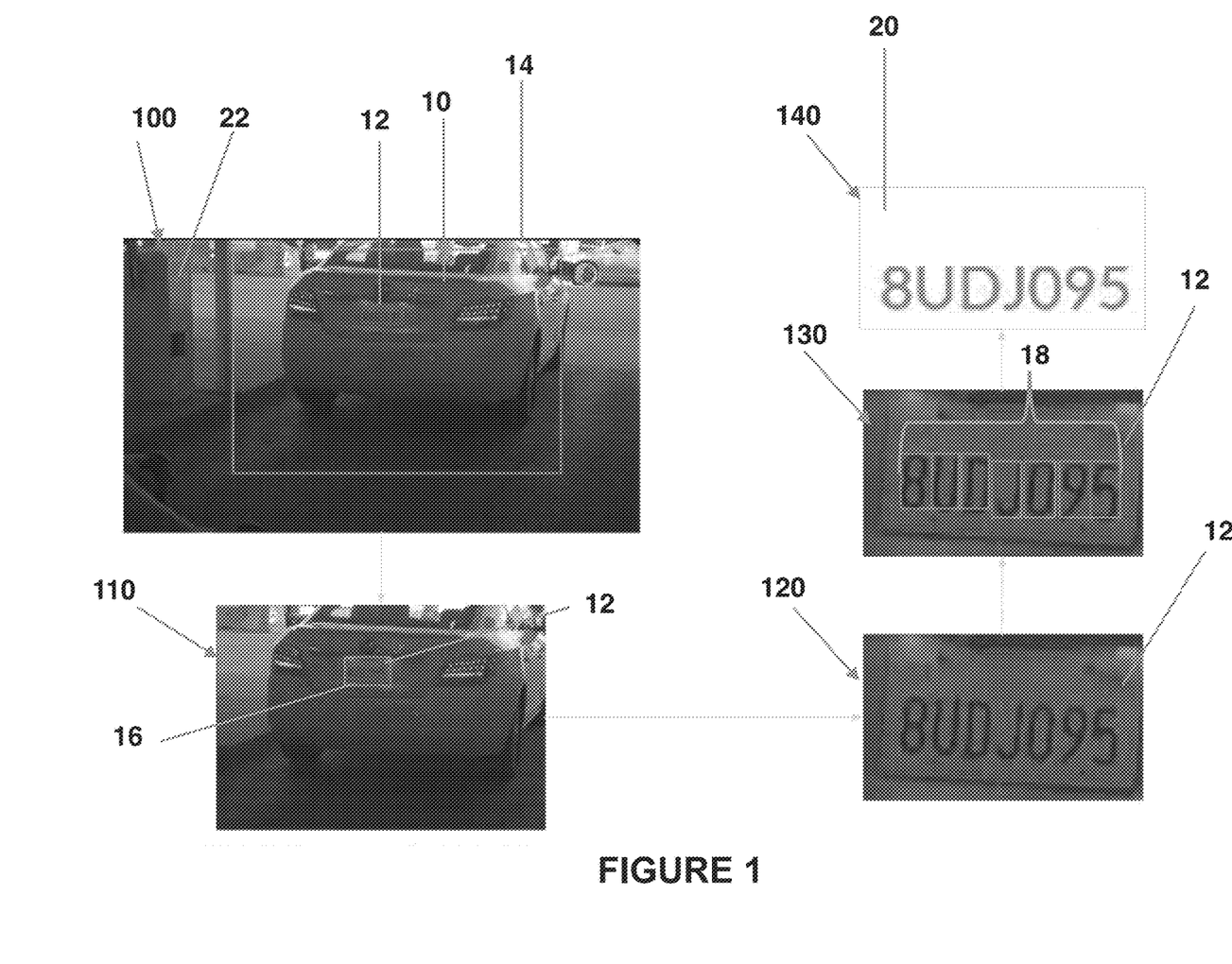
FIG. 1 shows an automatic license plate recognition system according to the invention.

FIG. 1 shows an automatic license plate recognition system according to the invention. In embodiments of the invention, in step 100, license plate recognition begins when a vehicle 10 passes through a detection point 22. There is no switch. Everything is detected by the camera when the vehicle 10 trips a detector, such as a laser beam that operates a camera in response thereto.

As a vehicle is driven through a gate, the camera detects motion while it continually captures video. The camera detects the vehicle and license plate in the video stream. An algorithm associated with the video stream of the camera is trained to detect license plates. It ignores other objects such as a person who happens to walk up to and through the gate. The camera is always operating. The camera starts executing a recognition algorithm when it detects motion. Whenever the camera detects any kind of motion, the recognition algorithm starts looking for license plates regardless of whether the motion is caused by a person, a tree, or any other moving object. Thus, upon detecting motion, the camera always starts looking for a license plate.

Motion is detected and then the camera starts capturing video. The camera is pointed in the direction where it expects to see a license plate. When the camera sees something in the frame that looks like a license plate, it starts grabbing frames. Because the camera captures video, it grabs more than one frame, i.e., the camera grabs multiple frames, e.g., one or two frames per second, although the camera may be set to grab 10 frames or more per second.

The camera captures several frames of video of a license plate 12. Each frame is a high-resolution image that is presented to a processing pipeline, and a final prediction is generated for each frame. The frame predictions are then aggregated.

After a predetermined number of frames are detected, such as 10 frames, an algorithm associated with the camera starts looking for the license plate. This action is performed for every frame captured by the camera in which motion is detected. Thus, whenever the camera detects motion, the camera tries to detect a license plate for every frame with a motion trigger.

For each frame there is a user-defined region of interest, i.e., a rectangle 14. Accordingly, when a vehicle pulls up to the gate, the camera notices motion. The camera detects the license plate within the user-defined region of interest 14 and captures a video frame that contains the license plate. As the vehicle continues to move, the camera captures additional frames of the license plate. The algorithm associated with the camera uses these frames for character detection.

At a next step 110, a license plate detector model produces a thumbnail of a defined region of interest, as shown in FIG. 1 by the rectangle 16, in which the license plate is located.

Significantly, embodiments of the invention do not detect vehicles and then license plates. Rather, embodiments of the invention directly detect license plates within each image of the several frames of video captured after the vehicle triggers the video collection process.

Once the license plate thumbnail of the image is detected, the license plate is cropped in step 120 from the high-resolution image. An algorithm detects each of the rectangles in the cropped image, i.e., where the license plate is located in the image.

In step 130, character detection is performed for each frame by an object detector to allow optical character recognition. Object detection identifies each character in the license plate, as shown by the series of rectangles 18, one rectangle for each character. The rectangles are arranged for character detection from the left to the right.

In step 140, after character recognition, there is a final prediction that results in the license-plate sequence. The algorithm integrates the frames. It is initially assumed that all the predictions are correct; however, there might be slight errors. Accordingly, the algorithms examine several frames, e.g., five frames. The algorithm looks for the most common length of the text. For example, the recognized characters are: 8 U D J 0 9 5. The algorithm looks for the most common length. In this example, there are seven characters. It is assumed that the final output is seven characters long. The algorithm only looks at the frames which have an output that is seven characters long. For each position, the algorithm looks at the character having the greatest confidence value. In this example, the first frame has the most confidence for the first character. In this example, the character is an 8. The algorithm selects the 8. For the second position, which in this example is a U, the algorithm looks at all five frames and then looks at the second character in all five frames. The model determines a confidence value for each character. In this example, the algorithm looks at the confidence value for the second character in all the five frames and selects the character in the frame that has the greatest confidence value. This process continues until the entire string, in this example seven characters, is constructed.

Embodiments of the invention also take into consideration the position of the boxes and optimize them even further. For example, instead of looking at the final string, the algorithm looks at the boxes that are produced and correlates these boxes to one another over multiple frames based on how they are positioned. The algorithm then makes a one-to-one correspondence between the boxes based on the position of each box. Thereafter, a confidence value can be established for each character at each position based on the several frames.

Figure 2:
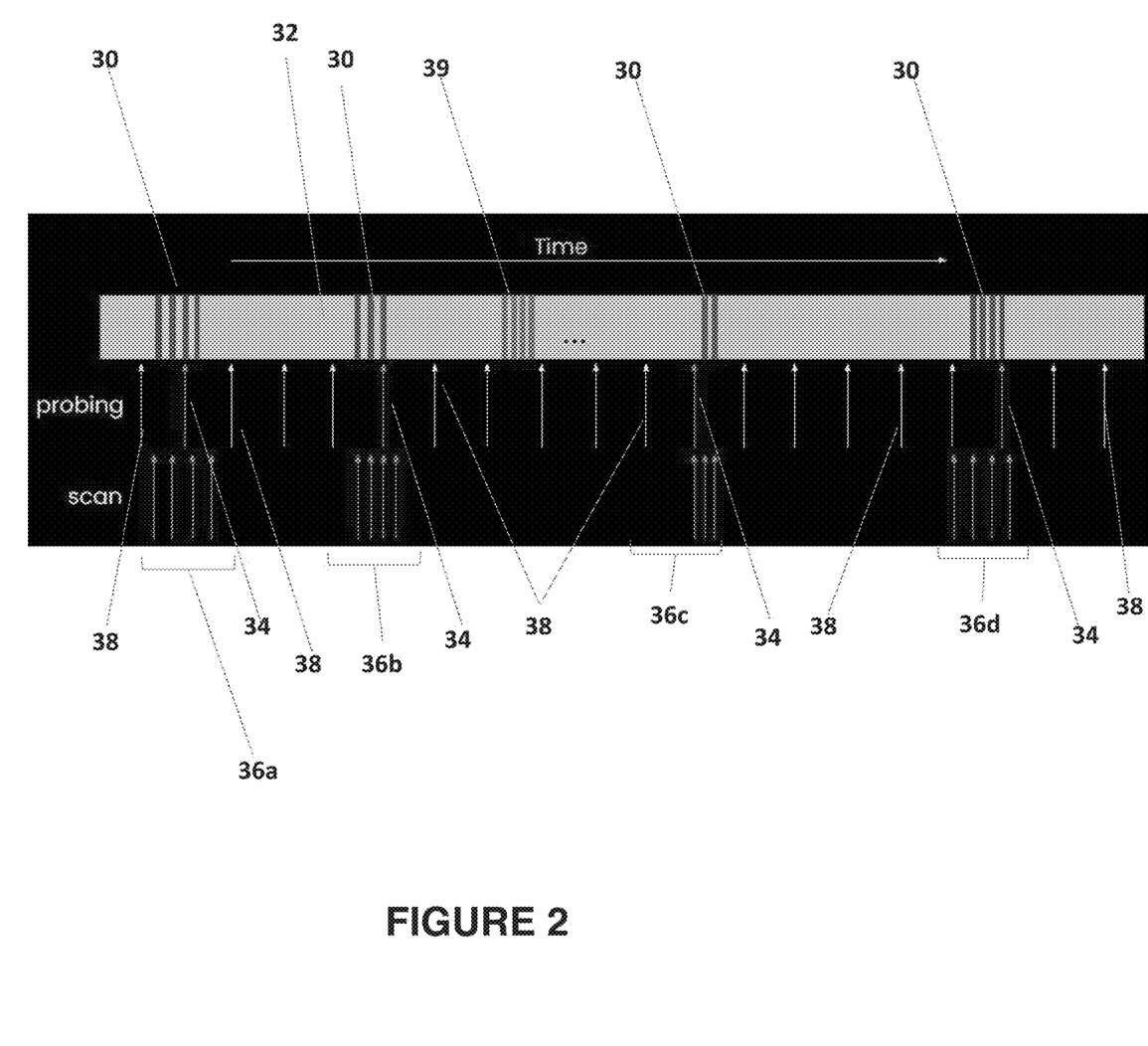
FIG. 2 is a timing diagram showing frame aggregation according to the invention.

FIG. 2 is a timing diagram showing frame aggregation according to the invention. In FIG. 2, multiple frames are shown. Several frame, e.g., five frames, are captured for each vehicle. The information within the frames is then aggregated. That is, an algorithm combines the results of the five frames.

Embodiments of the invention optimize central processing unit (CPU) time based on when the CPU is used. By default, the frames are probed. Frames 30 are shown along a bar 32 within a flow of time. The algorithm probes, for example, one frame out of every three. Alternatively, the frames are probed at intervals, for example, every two seconds. An arrow 34 signifies a frame in which a license plate is detected.

In FIG. 2, embodiments of the invention use the collection of detection models in TensorFlow Model Zoo API's CenterNet and MobileNet models with a low depth multiplier. Embodiments of the invention also use a probing algorithm to optimize overall compute resource usage for better precision and recall.

A buffer of frames is maintained. Whenever the camera detects the license plate, the algorithm is aware that there is a license plate in the frame, and it examines multiple frames near the timestamp of the frame in which the license plate is detected. For example, the 20 most recent frames are buffered. Accordingly, there is a list of recent frames. Whenever a license plate is detected in a frame, the buffer is checked. The algorithm examines several frames, e.g., five frames, that surround the detected frame, which is represented by the scan 36a, 36b, 36c, 36d.

The algorithm only uses computation time whenever a vehicle is detected. Whenever a probe detects a vehicle, there is a license plate in the frame. When this occurs, the algorithm immediately looks for license plates in additional frames which are close to the timestamp of the frame in which a vehicle is initially detected. The algorithm retrieves frames from the buffer that are close to that timestamp. The frames thus obtained are aggregated.

The scan lines 36a-36d are the grabs of license plate frames that are buffered. Each scan line represents a frame that has a license plate and in which motion is detected. The first four scan lines 36a, for example, are the four frames that are used to identify the license plate.

Certain lines 38 show frames that do not contain a license plate. Embodiments of the invention conserve CPU time when these frames are encountered because the frames are not processed to identify characters. If this approach were not taken, then it would be necessary to process every frame encountered at the scanning phase. This approach skips those frames that would not yield a license plate. Accordingly, rather than wasting CPU time, the algorithm looks only at frames around the timestamp.

Probing occurs when the camera is looking for motion. The line 34 in the probing area indicates that there is a license plate; the related bands 30 represent frames in which a license plate is detected. The line 39 indicates that nothing was detected. This is a false positive. In such a case, the algorithm checks around the neighborhood to see whether there actually is an event that is worth considering.

Embodiments of the invention also use a probing algorithm to optimize overall compute resource usage for better precision and recall. Once the frames are aggregated, the license plate characters are detected, as described above in connection with FIG. 1.

Multiline Character Recognition

Figure 3:
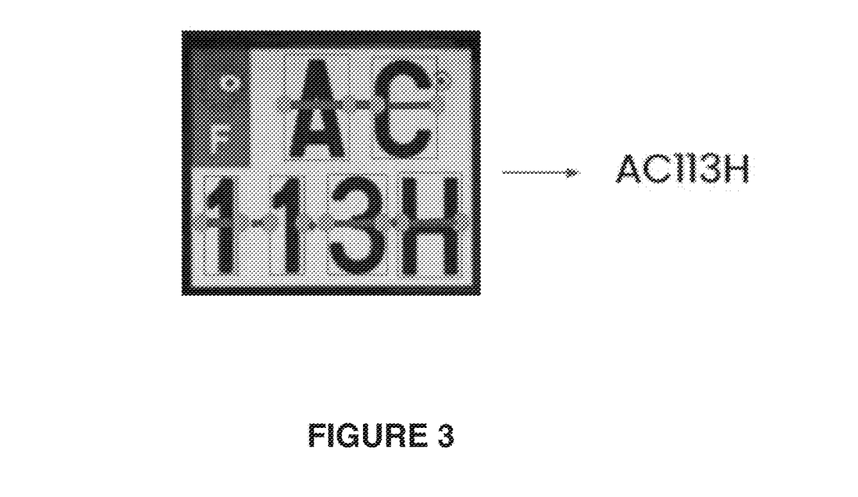
FIG. 3 shows multiline character recognition according to the invention.

FIG. 3 shows multiline character recognition according to the invention. Per the license plate character recognition scheme described above, the algorithm detects license plates and then detects characters within the license plates by identifying rectangles that comprise bounding boxes that contain characters with a high level of confidence.

The algorithm builds a graph of the detected bounding boxes. Nodes are defined relative to the centers of vertical sides of the detected bounding boxes.

Edges are drawn between nodes if:

The nodes belong to the same detection box;

The nodes have a minimum pairwise distance while maintaining the distance below a certain threshold;

All bounding boxes on the same line form a connected component of a graph; and

A depth-first search is used to identify the distinct components. A depth-first search (DFS) is an algorithm for traversing or searching tree or graph data structures. The algorithm starts at the root node (selecting some arbitrary node as the root node in the case of a graph) and explores as far as possible along each branch before backtracking.

In the case of multiline license plates, the output of the final machine learning model is not a string as described above but comprises a list of boxes. The algorithm then converts the list of boxes to a string as described above. Accordingly, embodiments of the invention build a computational graph out of detected bounding boxes.

In FIG. 3, the nodes of the graph are the centers of the vertical sides of the detected bounding boxes. If the nodes belong to the same box, they are connected, for example, as shown for the character "A" in FIG. 3. The algorithm checks the distances between each pair of nodes. If the distance is below a certain threshold, e.g., in embodiments typically one-half the height of the box, the algorithm joins the two points. In this way, adjacent boxes are joined.

Once the algorithm has identified the upper set of boxes (AC) by looking at the nodes and the spacing between the dots and likewise the lower set of boxes (113H), there are two sets of boxes that are linked to each other. The algorithm then uses a first come, first served algorithm to identify which of the boxes are connected. There are two components in each box. The algorithm begins by examining the boxes by their Y coordinates and reads them from top to bottom. Embodiments of the invention comprise two levels, looking at the components from top to bottom and then within each component from left to right.

A second search starts on the top set of boxes, which contain AC, and proceeds to the bottom set of boxes, which contain 113H. That is, looking left to right, the algorithm detects the boxes that contain AC and then, looking down and proceeding left to right, the algorithm sees the boxes that contain 113H.

The final output string is determined as described above by the aggregation algorithm. Thus, aggregation does not concern the boxes, only the text within the boxes. The text that is produced from the algorithm for each frame is combined to produce the resultant string, i.e., AC113H.

Stacked Character Recognition

Figure 4:
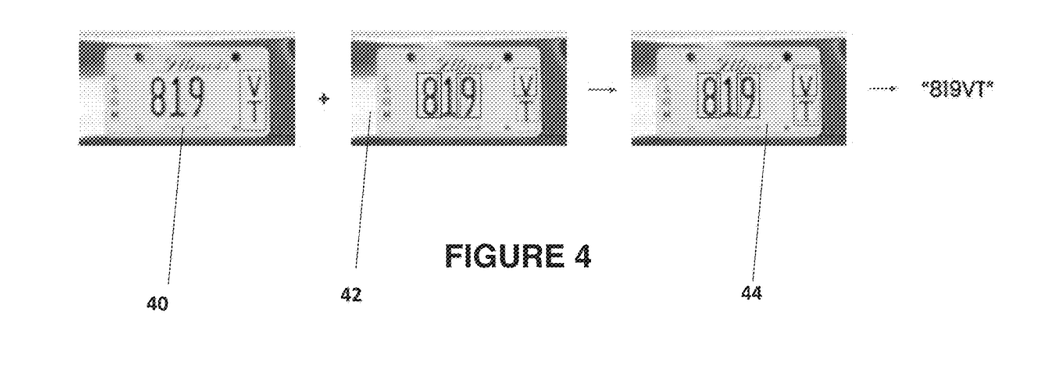
FIG. 4 shows stacked character recognition according to the invention.

FIG. 4 shows stacked character recognition according to the invention. In embodiments of the invention, an extra class is provided for the stacked character region. The algorithm detects characters of all sizes in the stacked character region. In embodiments of the invention there are 36 classes. The algorithm finds the stacked characters that intersect the detected stacked character region. The characters in the stacked character region are sorted vertically. All other characters, including those in the stacked character region, are then sorted horizontally.

As shown in FIG. 4, a first step detects the stacked character region 40 (1 Class). The algorithm then simultaneously detects characters of all sizes 42 (35 Classes). Thereafter, a final optical character recognition (OCR) object detection 44 is made and the final OCR string, i.e., 819VT, is output.

In this embodiment of the invention, there is an extra character referred to herein as the stacked character region. The detection model is trained for this particular use case, i.e., the model is also trained to detect a special region that contains stacked characters. In the embodiments above there are 36 classes. This embodiment has 37 classes, where the extra class is for the stacked character region. The model is trained to detect the stacked character region. Accordingly, the model yields a box for the 8, 1, 9. The model yields three boxes in the region where the V and T are, i.e., it first yields one large box and then two smaller boxes within the larger box, one box for the V and one box for the T. The algorithm then reads the boxes. The algorithm finds an intersection of each of the boxes with one another. It finds the intersection of the smaller box with the bigger box. The boxes that contain the V and T have a high intersection, such as 90% of one box is contained in the other box. The model determines where the start character region is for the stacked characters that are not connected with the other three characters 8, 1, 9.

There is a standardization of all boxes with each other. If the intersection is at a certain height, then that box is the start character region box. If there is no start character region box, then an intersection is not determined. When any box intersects adequately with a box in the adjacent region, that box is a start character box, and it is discarded from the process of reading from left to right. The model then starts reading from the left. The 8, 1, and 9 are in the start character region. It is already known which of the boxes are within that region. Based on the intersection method, instead of starting on the X axis and reading from left to right, the model starts on the Y axis and reads from top to bottom, reading the character V and then the character T.

The model initially yields six boxes. Five of the boxes are actual characters that are read from left to right and the sixth box is the stacked character region which is not read from left to right. Rather, the stacked region box is read from top to bottom. The final step is to link the characters read in the stacked region to those previously read.

To avoid false detection, the model automatically learns to detect certain regions. The model is trained to look for characters of a certain proportion or a certain size and it ignores other characters, e.g., Illinois.

Flowcharts

Figure 5A:
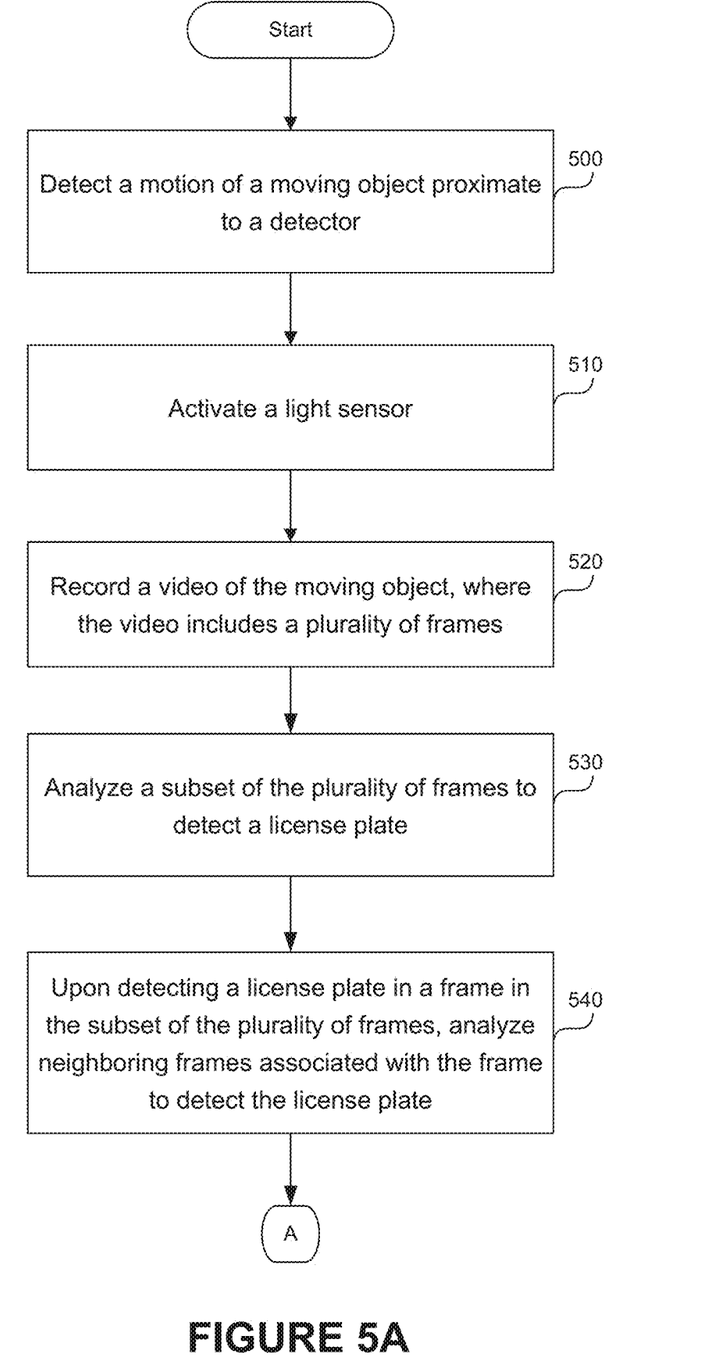
FIGS. 5A-5B show a flowchart of a method to detect and read a license plate.
Figure 5B:
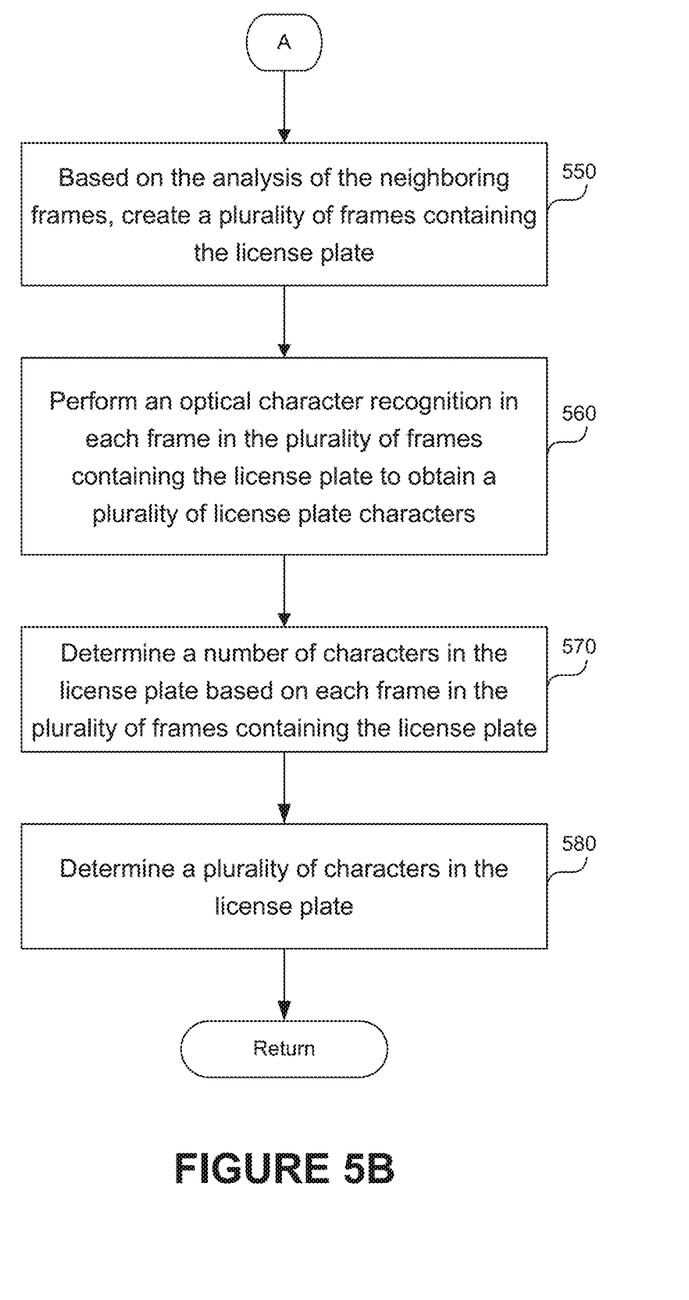

FIGS. 5A-5B show a flowchart of a method to detect and read a license plate. In step 500, a hardware or software processor executing instructions described in this application can detect a motion of a moving object proximate to a detector, such as a laser detector.

In step 510, the processor, upon detecting the motion, can activate a light sensor, such as a camera. The light sensor can be configured to reduce energy consumption by remaining inactive until the motion is detected.

In step 520, the light sensor can record a video of the moving object, where the video includes multiple frames recorded at a predetermined frame rate, between 1 frame per second and 30 frames per second.

In step 530, the processor can analyze a subset of the multiple frames to detect a license plate. For example, the processor can analyze every second, third, fourth, fifth, etc., frame among the multiple frames to detect the license plate.

In step 540, upon detecting a license plate in a frame in the subset of the multiple frames, analyze neighboring frames associated with the frame to detect the license plate, where the neighboring frames temporally precede and succeed the frame. For example, the processor can analyze immediately neighboring frames first, such as the immediately preceding frame and the immediately succeeding frame, for the license plate. If the processor detects a license plate in the immediately preceding and immediately succeeding frames, the processor can continue to the next immediately preceding and the next immediately succeeding frames. The processor can terminate the search of the neighboring frames when no license plate is detected in the preceding and/or succeeding frames.

In step 550, based on the analysis of the neighboring frames, the processor can create and/or aggregate multiple frames containing the license plate.

In step 560, the processor can perform an optical character recognition in each frame among the multiple frames containing the license plate to obtain multiple license plate characters. To perform the optical character recognition, the processor can obtain multiple bounding boxes indicating location of the multiple characters in the license plate. The processor can obtain among the multiple bounding boxes from a machine learning model trained to detect characters and produce bounding boxes. The processor can represent each box among the multiple boxes by a node to obtain multiple nodes. The location of the node can indicate a location of the box among the multiple boxes. The location of the box can be represented by Cartesian coordinates, such as X, Y coordinates. The processor can determine a distance between a first node among the multiple nodes and a second node among the multiple nodes based on a first location of the first node and a second location of the second node. The first location of the first node can be represented by first Cartesian coordinates, and the second location of the second node can be represented by second Cartesian coordinates. The processor can determine whether the distance is below a predetermined threshold, which can be computed based on a length of a long side of the box. For example, the predetermined threshold can be half of the length of the long side of the box. Upon determining that the distance is below the predetermined threshold, the processor can create a first edge between the first node and the second node, thereby obtaining a graph including the first node, the second node, and the first edge. Based on the first Cartesian coordinates and the second Cartesian coordinates, the processor can determine a leftmost node in the graph. In one embodiment, the processor can order the multiple characters into a sequence of characters based on the graph and the leftmost node in the graph. For example, the processor can determine the longest linear chain starting at the leftmost node in the graph. The linear chain follows only a single path from a single node, thus giving an ordering of the nodes and, consequently, an ordering of the characters in the linear chain. The ordering of the characters in the linear chain can become the sequence of characters in the license plate.

In step 570, the processor can determine a number of characters in the license plate based on each frame among the multiple frames containing the license plate. To determine the number of characters, the processor can determine a number of characters in each frame among the multiple frames containing the license plate to obtain a multiple numbers of characters. The processor can determine a most frequent number of characters among the multiple numbers of characters in multiple frames. The processor can determine whether one or more frames among the multiple frames containing the license plate contain one or more numbers of characters different from the most frequent number of characters. Upon determining that the one or more frames among the multiple frames containing the license plate contain one or more numbers of characters different from the most frequent number of characters, the processor can discard the one or more frames.

In step 580, the processor can determine multiple characters in the license plate by performing the following steps for each character among the multiple characters. The processor can determine a location of a character among the multiple characters, such as whether the character is first, second, third, etc., in the sequence of characters. Based on the location of the character among the multiple characters, the processor can determine corresponding characters in each frame among the multiple frames containing the license plate, wherein the corresponding characters in each frame of the characters have the same position as the character. For example, if the character is the first character in the frame, all the corresponding characters are first characters in their frames. If the character is in the fourth position in the frame, all the corresponding characters are in the fourth position in their frames. The processor can determine a most frequent character occurring among the character and the corresponding characters. For example, the multiple frames can contain 10 frames. In the second position among the 10 frames, 7 of the frames can have the character "O," while 2 of the frames can have the character "Q" and 1 frame can have the character "G." Consequently, the processor can determine that the character "O" has the greatest confidence value. The processor can determine the most frequent character, namely the character "R," to be part of the multiple characters in the license plate, and the processor can select the character "O" to be in the second position.

In one embodiment, to determine the sequence of characters, the processor can obtain multiple bounding boxes indicating location of the multiple characters in the license plate. The processor can represent each box among the multiple boxes by a node to obtain multiple nodes, where a location of the node indicates a location of the box among the multiple boxes. The location of the box can be represented by Cartesian coordinates. The processor can determine a distance between a first node among the multiple nodes and a second node among the multiple nodes based on a first location of the first node and a second location of the second node, where the first location of the first node and the second location of the second node are represented by first and second Cartesian coordinates, respectively. The processor can determine whether the distance is below a predetermined threshold, where the predetermined threshold is computed based on a length of a long side of the box. Upon determining that the distance is below the predetermined threshold, the processor can create a first edge between the first node and the second node, thereby obtaining a first graph including the first node, the second node, and the first edge.

The processor can determine whether a second graph disconnected from the first graph exists, where the second graph includes a third node not connected to the first graph via a second edge, where the third node includes third Cartesian coordinates. Upon determining that the second graph exists, based on the first Cartesian coordinates, second Cartesian coordinates, and the third Cartesian coordinates, the processor can determine an ordering of the first graph and the second graph. The processor can order the first graph and the second graph based on the X or Y coordinate values of the nodes in each graph. The X or Y coordinate values can be the average X or Y value for all the nodes in a graph, or the X or Y coordinate value can be the highest X or Y coordinate of a node in a graph. The user can indicate the ordering. In some cases, the user can indicate the ordering to be from left to right, in which case the processor orders the graph based on the X coordinates. In other cases, the user can indicate the ordering to be from top to bottom, in which case the processor orders the graph based on the Y coordinates. The processor can order the multiple characters into a sequence of characters based on the ordering of the first graph and the second graph. For example, the processor can include the characters in the first graph initially, followed by the characters in the second graph.

In one embodiment, to determine the sequence of characters, the processor can obtain multiple bounding boxes indicating location of the multiple characters in the license plate. The processor can represent each box among the multiple boxes by a node to obtain multiple nodes, where a location of the node indicates a location of the box among the multiple boxes. The processor can determine a distance between a first node among the multiple nodes and a second node among the multiple nodes based on a first location of the first node and a second location of the second node. The processor can determine whether the distance is below a predetermined threshold, where the predetermined threshold is computed based on a length of a long side of the box. Upon determining that the distance is below the predetermined threshold, the processor can create a first edge between the first node and the second node, thereby obtaining a first graph including the first node, the second node, and the first edge. The processor can determine whether a second graph disconnected from the first graph exists, where the second graph includes a third node not connected to the first graph via a second edge.

The processor can receive an indication of how to order the first graph and the second graph. For example, the indication can be a textual explanation indicating whether to order the graphs based on X, Y, or Z coordinates. If there are more than two graphs, the processor can order the graphs in multiple passes. In the initial ordering, the processor can order the first graph and the second graph based on the X coordinate, and then in the second ordering, the processor can order the group of the first graph, the second graph, and the third graph based on the Y coordinate.

Upon determining that the second graph exists, based on the indication of how to order the first graph and the second graph, the processor can determine an ordering of the first graph and the second graph. The processor can order the multiple characters into a sequence of characters based on the ordering of the first graph and the second graph. For example, the characters contained in the first graph contain the initial characters in the license plate, followed by the characters contained in the second graph.

The processor can train a machine learning model to detect the character having a predetermined proportion or a predetermined size, and can train the machine learning model to produce a bounding box associated with the character. For example, the model can automatically learn to detect certain regions, and characters of a certain proportion or a certain size, while ignoring other characters.

The light sensor can operate at varying frame rates that vary based on the speed of the moving object whose license plate needs to be detected. To adjust the frame rate of the light sensor, the processor can detect, by the detector, a velocity of the moving object. Upon detecting the motion, the processor can activate the light sensor, which can be configured to record the video at an adjustable frame rate. Based on the velocity, the processor can adjust the frame rate associated with the light sensor, where a high velocity causes a first frame rate associated with a camera, where a low velocity causes a second frame rate associated with the camera, and where the first frame rate is higher than the second frame rate. Low velocity can be a velocity up to and including 10 mph. The first frame rate can be 2 frames per second. As the velocity increases, the frame rate can increase in proportion to the velocity. For example, if the velocity reaches 20 mph, the frame rate can be 4 frames per second. The processor can record a video of the moving object at the adjusted frame rate.

Figure 6A:
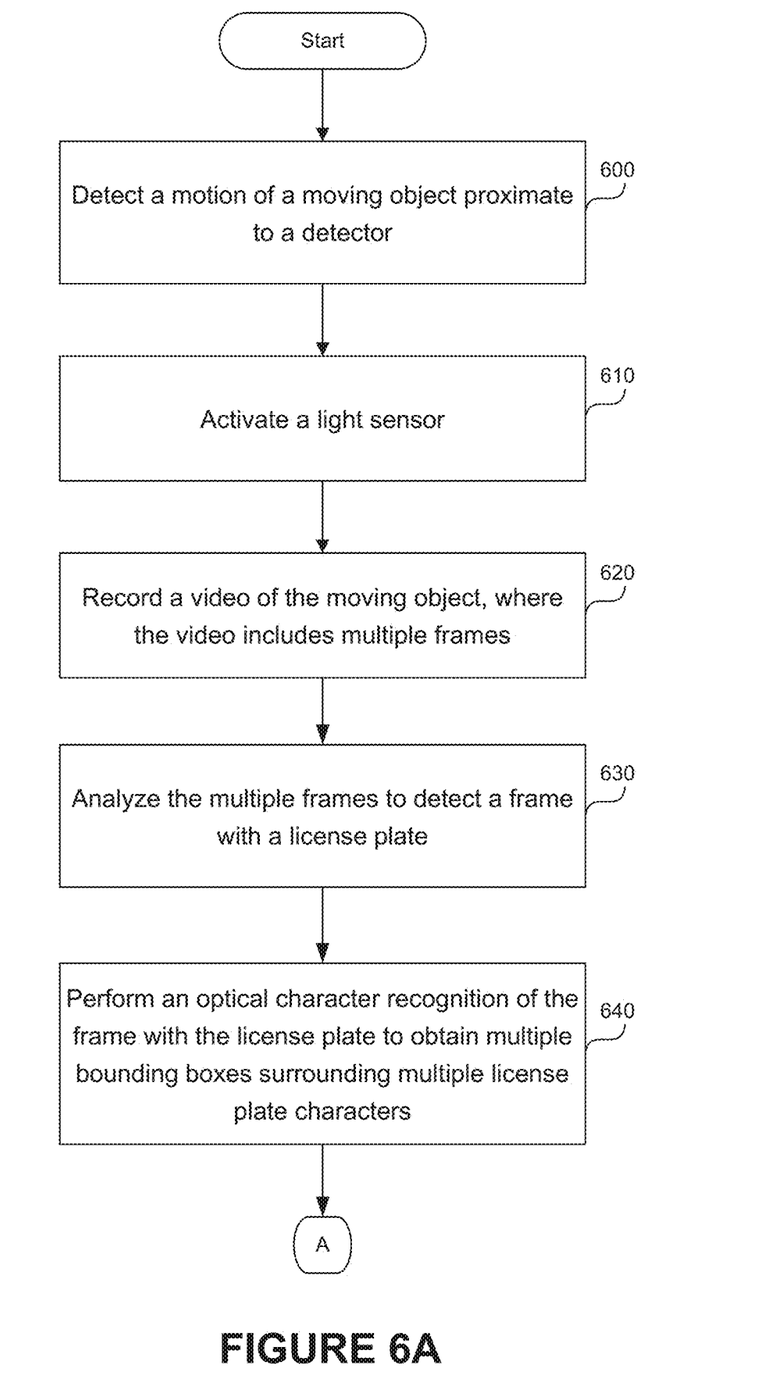
FIGS. 6A-6B show a flowchart of a method to detect and read a license plate when at least a portion of the characters in the license plate are stacked vertically.
Figure 6B:
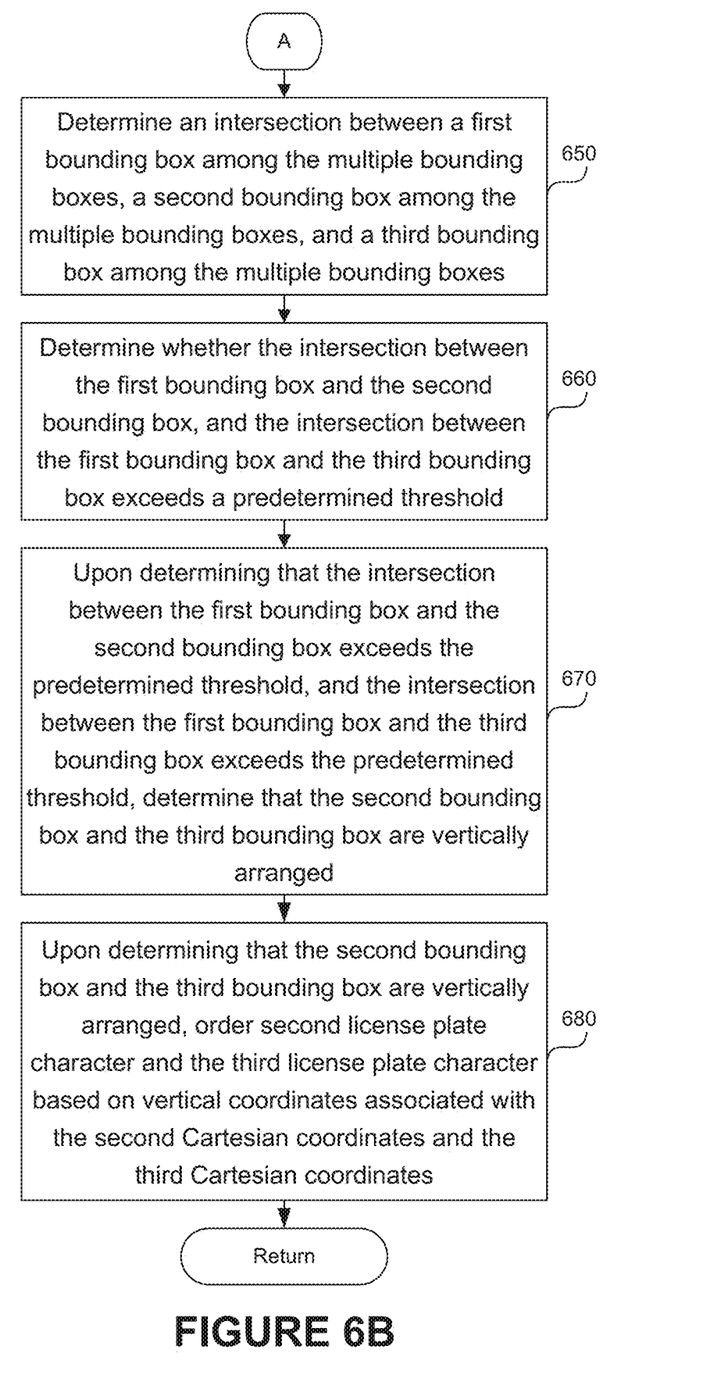

FIGS. 6A-6B show a flowchart of a method to detect and read a license plate when at least a portion of the characters in the license plate are stacked vertically. In step 600, the processor can detect a motion of a moving object proximate to a detector. In step 610, the processor can activate a light sensor. In step 620, the processor can record a video of the moving object, where the video includes multiple frames.

In step 630, the processor can analyze of the multiple frames to detect a frame with a license plate. In step 640, the processor can perform an optical character recognition of the frame with the license plate to obtain multiple bounding boxes surrounding multiple license plate characters, wherein a bounding box among the multiple bounding boxes includes Cartesian coordinates indicating a location of the bounding box.

In step 650, the processor can determine an intersection between a first bounding box among the multiple bounding boxes, a second bounding box among the multiple bounding boxes, and a third bounding box among the multiple bounding boxes. The second bounding box can include a second license plate character, the third bounding box includes a third license plate character. The second bounding box can include second Cartesian coordinates, and the third bounding box can include third Cartesian coordinates.

In step 660, the processor can determine whether the intersection between the first bounding box and the second bounding box, and the intersection between the first bounding box and the third bounding box exceeds a predetermined threshold, such as 90% of the second and the third bounding box are contained in the first bounding box. In step 670, upon determining that the intersection between the first bounding box and the second bounding box exceeds the predetermined threshold, and the intersection between the first bounding box and the third bounding box exceeds a predetermined threshold, the processor can determine that the second bounding box and the third bounding box are vertically arranged.

In step 680, upon determining that the second bounding box and the third bounding box are vertically arranged, the processor can order second license plate character and the third license plate character based on vertical coordinates associated with the second Cartesian coordinates and the third Cartesian coordinates.

Computer System

Figure 7:
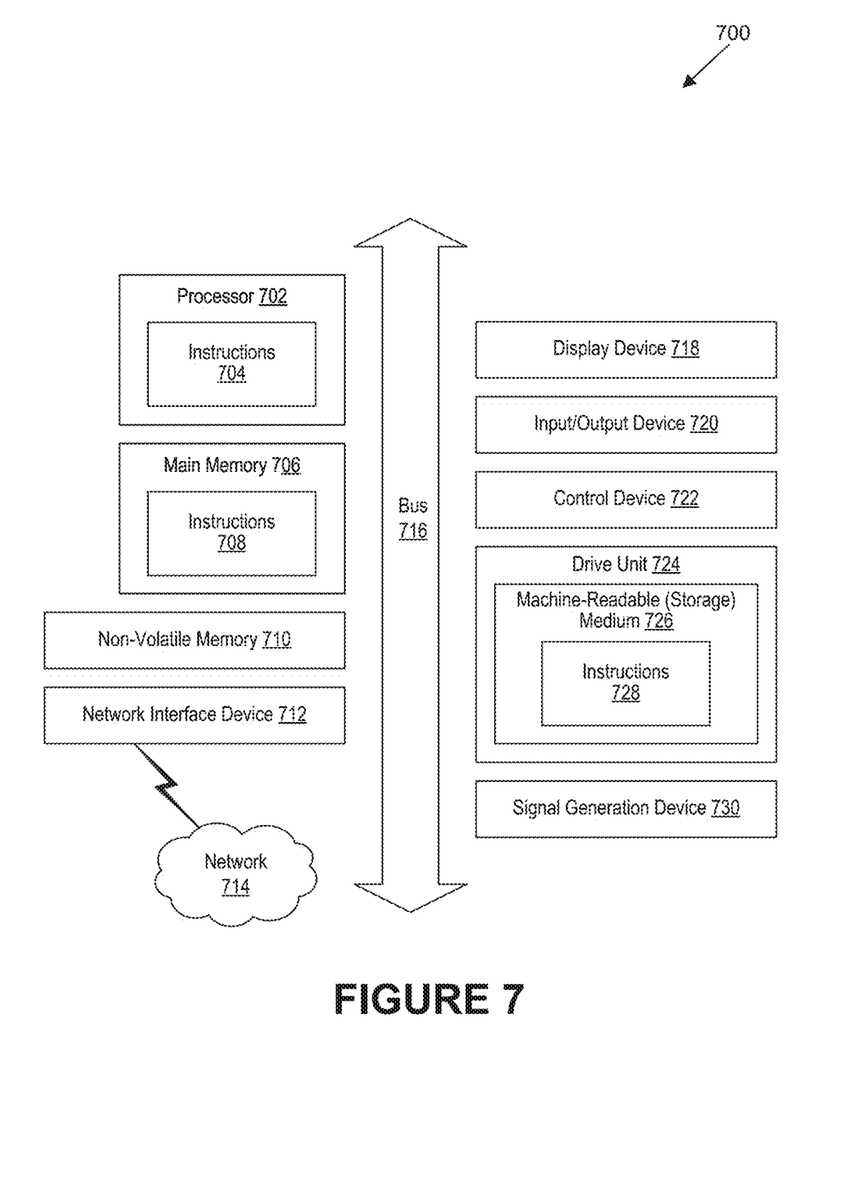
FIG. 7 is a block diagram that illustrates an example of a computer system 600 in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A method comprising:
analyzing a plurality of frames of a video of an object to detect a license plate associated with the object;
upon detecting the license plate in a frame of the plurality of frames, determining a subset of frames containing the license plate by analyzing neighboring frames associated with the frame to detect the license plate;
determining a plurality of characters in the license plate by, for each character in the plurality of characters:
based on a location of the character in the plurality of characters, determining corresponding characters in each frame in the subset of frames; and
determining, to be a part of the plurality of characters, a most frequent character among the character and the corresponding characters;
obtaining a plurality of bounding boxes indicating locations of the plurality of characters the locations represented by Cartesian coordinates;
obtaining a plurality of nodes based on the plurality of bounding boxes, wherein a respective location of each respective node indicates a respective location of a respective box in the plurality of bounding boxes;
determining a distance based on a first location of a first node of the plurality of nodes and a second location of a second node of the plurality of nodes;
determining whether the distance is below a threshold, wherein the threshold is computed based on a length of a long side of a box of the plurality of bounding boxes;
based on a determination that the distance is below the threshold, creating a first edge between the first and second nodes, thereby obtaining a first graph including the first node, the second node, and the first edge;
determining a leftmost node in the first graph based on first Cartesian coordinates representing the first location and second Cartesian coordinates representing the second location; and
ordering the plurality of characters into a sequence of characters based on the first graph and the leftmost node in the first graph.

2. The method of claim 1, comprising:
performing an optical character recognition in each frame in the plurality of frames containing the license plate associated with the object to obtain a plurality of license plate characters associated with the object;
determining a number of characters in each frame in the plurality of frames containing the license plate associated with the object to obtain a plurality of numbers of characters;
determining a most frequent number of characters among the plurality of numbers of characters;
determining whether one or more frames in the plurality of frames containing the license plate associated with the object contain one or more numbers of characters different from the most frequent number of characters; and
upon determining that the one or more frames in the plurality of frames containing the license plate associated with the object contain the one or more numbers of characters different from the most frequent number of characters, discarding the one or more frames.

3. The method of claim 1, further comprising:
determining whether a second graph disconnected from the first graph exists,
wherein the second graph includes a third node not connected to the first graph via a second edge,
and wherein the third node includes third Cartesian coordinates; and
upon determining that the second graph exists, determining an ordering of the first graph and the second graph based on the first Cartesian coordinates, the second Cartesian coordinates, and the third Cartesian coordinates, wherein ordering the plurality of characters comprises ordering the plurality of characters into the sequence of characters based on the ordering of the first graph and the second graph.

4. The method of claim 1, further comprising:
determining whether a second graph disconnected from the first graph exists,
wherein the second graph includes a third node not connected to the first graph via a second edge;
receiving an indication of how to order the first graph and the second graph; and
upon determining that the second graph exists, based on the indication of how to order the first graph and the second graph, determining an ordering of the first graph and the second graph, wherein ordering the plurality of characters comprises ordering the plurality of characters into the sequence of characters based on the ordering of the first graph and the second graph.

5. The method of claim 1, further comprising:
detecting a velocity of the object;
activating a camera,
  wherein the camera is configured to record the video at an adjustable frame rate;
based on the velocity, adjusting the adjustable frame rate associated with the camera,
  wherein a high velocity causes a first frame rate associated with the camera,
  wherein a low velocity causes a second frame rate associated with the camera, and
  wherein the first frame rate is higher than the second frame rate; and
recording the video of the object at the adjusted frame rate.

6. A system comprising:
at least one hardware processor; and
at least one non-transitory memory storing instructions, which, when executed by the at least one hardware processor, cause the system to:
  analyze a plurality of frames of a video of an object to detect an alphanumeric identifier associated with the object;
  upon detecting the alphanumeric identifier associated with the object in a frame of the plurality of frames, determine a subset of frames containing the alphanumeric identifier by analyzing neighboring frames associated with the frame to detect the alphanumeric identifier
  determine a plurality of characters by:
    based on a location of the character in the plurality of characters, determining corresponding characters in each frame in the subset of frames;
    determine, to be a part of the plurality of characters, a most frequent character occurring among the character and the corresponding characters;
  obtain a plurality of bounding boxes indicating locations of the plurality of characters, the locations represented by Cartesian coordinates;
  obtain a plurality of nodes based on the plurality of bounding boxes, wherein a respective location of each respective node indicates a respective location of a respective box in the plurality of bounding boxes;
  determine a distance based on a first location of a first node of the plurality of nodes and a second location of a second node of the plurality of nodes;
  determine whether the distance is below a threshold, wherein the threshold is computed based on a length of a long side of a box of the plurality of bounding boxes;
  based on a determination that the distance is below the threshold, create a first edge between the first and second nodes, thereby obtaining a first graph including the first node, the second node, and the first edge;
  determine a leftmost node in the first graph based on first Cartesian coordinates representing the first location and second Cartesian coordinates representing the second location; and
  order the plurality of characters into a sequence of characters based on the first graph and the leftmost node in the first graph.

7. The system of claim 6, the instructions further comprising instructions that causes the at least one hardware processor to:
perform an optical character recognition in each frame in the plurality of frames containing the alphanumeric identifier associated with the object to obtain a plurality of alphanumeric identifier characters associated with the object; and
determine a number of characters associated with the alphanumeric identifier associated with the object based on each frame in the plurality of frames containing the alphanumeric identifier associated with the object.

8. The system of claim 6,
the instructions further comprising instructions that causes the at least one hardware processor to:
determine whether a second graph disconnected from the first graph exists,
  wherein the second graph includes a third node not connected to the first graph via a second edge,
  wherein the third node includes third Cartesian coordinates;
upon determining that the second graph exists, determine an ordering of the first graph and the second graph based on the first Cartesian coordinates, the second Cartesian coordinates, and the third Cartesian coordinates, wherein ordering the plurality of characters comprises ordering the plurality of characters into the sequence of characters based on the ordering of the first graph and the second graph.

9. The system of claim 6, the instructions further comprising instructions that causes the at least one hardware processor to:
determine whether a second graph disconnected from the first graph exists,
  wherein the second graph includes a third node not connected to the first graph via a second edge;
receive an indication of how to order the first graph and the second graph; and
upon determining that the second graph exists, based on the indication of how to order the first graph and the second graph, determine an ordering of the first graph and the second graph, wherein ordering the plurality of characters comprises ordering the plurality of characters into the sequence of characters based on the ordering of the first graph and the second graph.

10. The system of claim 6, the instructions further comprising instructions that causes the at least one hardware processor to:
train a machine learning model to detect a target character having a predetermined proportion or a predetermined size; and
train the machine learning model to produce a bounding box associated with the target character.

11. The system of claim 6, the instructions further comprising instructions that causes the at least one hardware processor to:
detect a velocity of the object;
activate a light sensor,
  wherein the light sensor is configured to record the video at an adjustable frame rate;
based on the velocity, adjust the adjustable frame rate associated with the light sensor,
  wherein a high velocity causes a first frame rate associated with the light sensor,
  wherein a low velocity causes a second frame rate associated with the light sensor, and
  wherein the first frame rate is higher than the second frame rate; and
record the video of the object at the adjusted frame rate.

12. At least one computer-readable storage medium, excluding transitory signals and carrying instructions, which, when executed by at least one data processor of a system, cause the system to:
- analyze a plurality of frames of a video of an object to detect an alphanumeric identifier associated with the object;
- upon detecting the alphanumeric identifier in a frame of the plurality of frames, determine a subset of frames containing the alphanumeric identifier by analyzing neighboring frames associated with the frame to detect the alphanumeric identifier;
- determine a plurality of characters by performing, for each character in the plurality of characters:
  - based on a location of the character in the plurality of characters, determine corresponding characters in each frame in the subset of frames;
  - determine, to be a part of the plurality of characters, a most frequent character occurring among the character and the corresponding characters;
- obtain a plurality of bounding boxes indicating locations of the plurality of characters, the locations represented by Cartesian coordinates;
- obtain a plurality of nodes based on the plurality of bounding boxes, wherein a respective location of each respective node indicates a respective location of a respective box in the plurality of bounding boxes;
- determine a distance based on a first location of a first node of the plurality of nodes and a second location of a second node of the plurality of nodes;
- determine whether the distance between a first node and a second node of the plurality of nodes is below a threshold, wherein the threshold is computed based on a length of a long side of a box of the plurality of bounding boxes;
- based on a determination that the distance is below the threshold, create a first edge between the first and second nodes, thereby obtaining a first graph including the first node, the second node, and the first edge;
- determine a leftmost node in the first graph based on first Cartesian coordinates representing the first location and second Cartesian coordinates representing the second location; and
- order the plurality of characters into a sequence of characters based on the first graph and the leftmost node in the first graph.

13. The at least one computer-readable storage medium of claim 12, wherein the instructions further comprise instructions that causes the at least one data processor to:
- determine whether a second graph disconnected from the first graph exists,
  - wherein the second graph includes a third node not connected to the first graph via a second edge,
  - wherein the third node includes third Cartesian coordinates;
- upon determining that the second graph exists, determine an ordering of the first graph and the second graph based on the first Cartesian coordinates, the second Cartesian coordinates, and the third Cartesian coordinates, wherein ordering the plurality of characters comprises ordering the plurality of characters into the sequence of characters based on the ordering of the first graph and the second graph.

14. The at least one computer-readable storage medium of claim 12, wherein the instructions further comprise instructions that causes the at least one data processor to:
- determine whether a second graph disconnected from the first graph exists,
  - wherein the second graph includes a third node not connected to the first graph via a second edge;
- receive an indication of how to order the first graph and the second graph; and
- upon determining that the second graph exists, based on the indication of how to order the first graph and the second graph, determine an ordering of the first graph and the second graph, wherein ordering the plurality of characters comprises ordering the plurality of characters into the sequence of characters based on the ordering of the first graph and the second graph.

15. The at least one computer-readable storage medium of claim 12, wherein the instructions further comprise instructions that causes the at least one data processor to:
- train a machine learning model to detect a target character having a predetermined proportion or a predetermined size; and
- train the machine learning model to produce a bounding box associated with the target character.

16. The at least one computer-readable storage medium of claim 12, wherein the instructions further comprise instructions that causes the at least one data processor to:
- detect a velocity of the object;
- activate a light sensor,
  - wherein the light sensor is configured to record the video at an adjustable frame rate;
- based on the velocity, adjust the adjustable frame rate associated with the light sensor,
  - wherein a high velocity causes a first frame rate associated with the light sensor,
  - wherein a low velocity causes a second frame rate associated with the light sensor, and
  - wherein the first frame rate is higher than the second frame rate; and
- record the video of the object at the adjusted frame rate.

17. The at least one computer-readable medium of claim 12, wherein the instructions further comprise instructions that causes the at least one data processor to:
- perform an optical character recognition in each frame in the plurality of frames containing the alphanumeric identifier associated with the object to obtain a plurality of alphanumeric identifier characters associated with the object; and
- determine a number of characters associated with the alphanumeric identifier associated with the object based on each frame in the plurality of frames containing the alphanumeric identifier associated with the object.

* * * * *